(12) United States Patent
Bumgarner et al.

(10) Patent No.: US 6,533,216 B1
(45) Date of Patent: Mar. 18, 2003

(54) SYSTEM AND METHODS FOR PROVIDING UNDER-WRAP ACCESS TO OPTICAL FIBER WOUND ONTO SPOOLS

(75) Inventors: Kirk P. Bumgarner, Wilmington, NC (US); Daniel C. Fuccella, Cary, NC (US); Michael T. Murphy, Oak Island, NC (US); Kenneth W. Roberts, Wilmington, NC (US); David A. Tucker, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/438,112

(22) Filed: Nov. 10, 1999

Related U.S. Application Data

(60) Provisional application No. 60/115,540, filed on Jan. 12, 1999, and provisional application No. 60/114,516, filed on Dec. 30, 1998.

(51) Int. Cl.⁷ .......................... B65H 75/18; B65H 75/14
(52) U.S. Cl. ................ 242/603; 242/118.41; 242/614.1
(58) Field of Search ............... 242/603, 476.4, 242/614, 614.1, 118.41, 118.4

(56) References Cited

U.S. PATENT DOCUMENTS

| | | | | |
|---|---|---|---|---|
| 629,115 A | * | 7/1899 | Turney | 242/603 |
| 1,626,322 A | * | 4/1927 | Bell | 242/603 |
| 1,689,016 A | * | 10/1928 | Erlewine | 242/603 |
| 2,359,211 A | * | 9/1944 | Fox | 242/603 |
| 3,099,414 A | * | 7/1963 | Kulka | 242/614 |
| 4,291,841 A | | 9/1981 | Dalrymple et al. | 242/474.5 |
| 4,387,863 A | | 6/1983 | Edmonston et al. | |
| 4,542,862 A | * | 9/1985 | Romike et al. | 242/118.4 X |
| 4,653,331 A | | 3/1987 | Inouye et al. | |
| 4,696,438 A | | 9/1987 | Myers | |
| 4,798,346 A | | 1/1989 | Myers et al. | 242/474.9 |
| 5,236,145 A | | 8/1993 | Floury et al. | |
| 5,441,215 A | * | 8/1995 | Nagayama et al. | 242/603 X |
| 5,593,101 A | | 1/1997 | Varga | 242/474.7 |
| 5,971,317 A | * | 10/1999 | Jaros | 242/614 |
| 6,027,062 A | | 2/2000 | Bacon et al. | 242/474.7 |
| 6,179,245 B1 | * | 1/2001 | Ripplinger | 242/614.1 |
| 6,213,425 B1 | * | 4/2001 | Umeki et al. | 242/614.1 |
| 6,230,999 B1 | * | 5/2001 | Tanaka | 242/614 X |
| 6,305,639 B1 | * | 10/2001 | Bocciola | 242/614.1 X |

FOREIGN PATENT DOCUMENTS

| | | | |
|---|---|---|---|
| EP | 0873962 | 10/1988 | |
| EP | 0 499201 | 8/1992 | |
| EP | 0514852 | 11/1992 | |
| EP | 0 514858 | 11/1992 | |
| EP | 0631964 | 1/1995 | |
| EP | 0662623 | 7/1995 | |
| FR | 2531688 | 2/1984 | |
| JP | 5-335923 | * 12/1993 | 242/614.1 X |
| JP | 2000-72329 | 9/1998 | |

* cited by examiner

*Primary Examiner*—Kathy Matecki
*Assistant Examiner*—Minh-Chau Pham
(74) *Attorney, Agent, or Firm*—Randall S. Wayland

(57) ABSTRACT

An optical fiber shipping spool, winding system and method for allowing automated winding of an accessible lead meter portion of optical fiber onto the spool. The spool comprises primary and lead meter barrels separated by an outboard flange. The outboard flange has a slot extending to its periphery, the slot providing a path for fiber between the lead meter and primary barrels, the slot having an inlet facing the lead meter barrel and an outlet facing the primary barrel. The slot is angled such that when fiber being wound onto the lead meter barrel comes into contact with the slot inlet, the fiber is automatically drawn into the slot and then guided by the slot onto the primary barrel. According to another aspect, a high-strength rib configuration is disclosed including a plurality of curved, intersecting ribs formed on a flange of the spool.

38 Claims, 15 Drawing Sheets

SYSTEM AND METHODS FOR PROVIDING UNDER-WRAP ACCESS TO OPTICAL FIBER WOUND ONTO SPOOLS

This application claims the benefit of U.S. Provisional Application Serial No. 60/114,516 filed Dec. 30, 1998 and U.S. Provisional Application Serial No. 60/115,540, filed Jan. 12, 1999.

BACKGROUND OF THE INVENTION

1. Field of the Invention

The present invention relates generally to improvements to the manufacture of optical fiber, and more particularly to advantageous aspects of a system and methods for providing under-wrap access to optical fiber wound onto spools.

2. Description of the Prior Art

At the end of the manufacturing process, optical fiber is typically wound onto a shipping spool for internal processing, shipping to a customer, and subsequent processing at the customer's facility. In order to allow the entire length of the fiber to be tested for various attributes, such as attenuation, it is necessary to provide access to both ends of the wound fiber. It is also desirable to have access to both ends of the fiber so that fiber samples may be removed from either end for other optical and geometric measurements.

There is no problem in obtaining access to the outer end of the fiber. Fiber from that end may simply be unwound from the spool, as needed. On the other hand, special accommodations must be made to provide access to the inner end of the fiber, also known as the "under-wrap," as that end lies under the fiber pack which may consist of hundreds of layers of fiber wound onto the shipping spool. The "lead meter", is attached to the under-wrap that is readily accessible.

One currently known method for creating access to the under-wrap is an inefficient and time-consuming manual process, described below in connection with FIGS. 1A–C. Therefore, there is a need for a system and methods for easily and readily providing access to the optical fiber under-wrap.

SUMMARY OF THE INVENTION

The present invention provides a shipping spool and winding system that allows, for example, automatic winding of an accessible lead meter portion of optical fiber onto the spool. In one aspect, the invention provides a spool comprising a primary barrel portion and a lead meter barrel portion separated from each other by an outboard flange; the outboard flange having a slot extending to its periphery. The slot provides a path for fiber to pass between the lead meter barrel portion and the primary barrel portion, the slot having an inlet facing the lead meter barrel portion and an outlet facing the primary barrel portion. The slot is angled such that when fiber being wound onto the lead meter barrel portion comes into contact with the slot inlet, the fiber is, by virtue of its angle, drawn into the slot and then guided by the slot onto the primary barrel portion.

According to another aspect, the invention comprises a fiber optic winding spool having a flange including a plurality of curved, intersecting ribs. Preferably, the plurality of curved, intersecting ribs form at least one circumferential row of diamond-shaped strengthening members that add significant strength to the spool. The spool may also include a circumferential rib and/or a plurality of radially extending ribs for added strength. The curved, intersecting ribs may be used in combination with the angled slot described above to provide for a high-strength optical fiber spool wherein the lead meter portion and the bulk fiber portions may be wound one after the other by automated process equipment.

Additional features and advantages of the present invention will become apparent by reference to the following detailed description and accompanying drawings.

DETAILED DESCRIPTION

In one method for making optical fiber, during the "draw" phase of the process, fiber is drawn from a preform at a draw tower and then wound onto a bulk spool containing as much as 400 kilometers of optical fiber. In the "screening" phase of the process, the bulk spool is taken "off-line," i.e., disconnected from the fiber output of the draw tower, and then placed onto an Off-Line Screening (OLS) machine. There, the optical fiber is tested for strength, wound onto a shipping spool and then cut to length for further processing and shipping. Typically, in the draw phase, the optical fiber is wound onto the bulk spool by rotating the spool at high speed as fiber is fed onto the spool by a flying head that travels alongside the spool, back and forth along its length. In the screening phase, on the other hand, an alternative winding technique may be used, in which the optical fiber is wound onto the shipping spool by rotating the spool at high speed and moving the spool back and forth along its longitudinal axis as fiber is fed onto it. However, it will be appreciated in light of the following discussion that the present invention can be practiced with either type of winding setup.

Figure 1B:
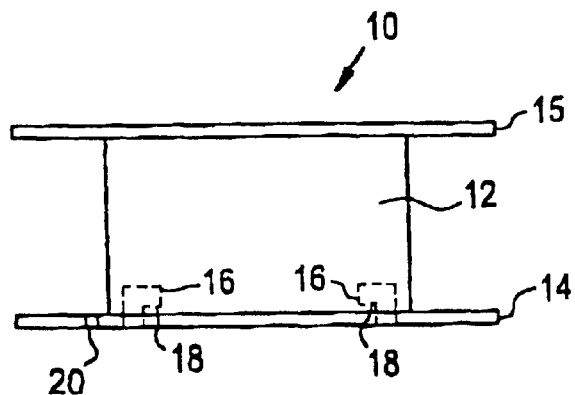
FIGS. 1A and 1B show, respectively, bottom and side views of a shipping spool according to the prior art.
Figure 1C:
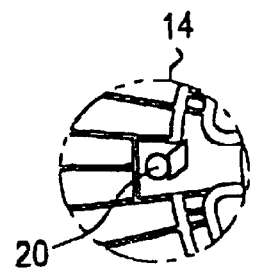
FIG. 1C shows a close-up view of a lead meter hole in the shipping spool shown in FIGS. 1A and 1B.
Figure 1A:
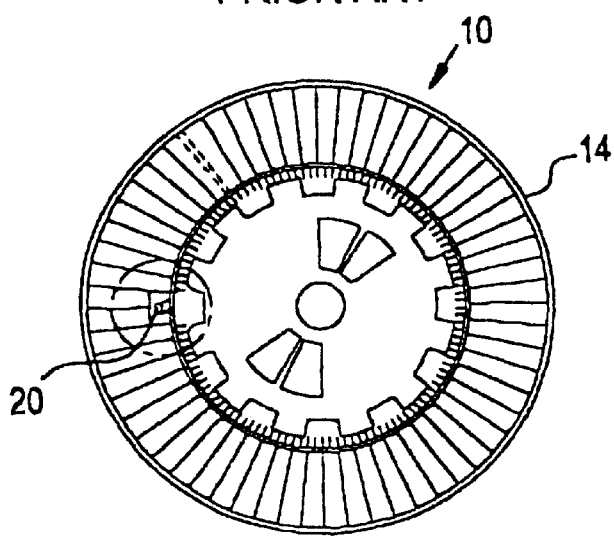

FIGS. 1A and 1B show, respectively, top and side views of a prior-art optical fiber shipping spool 10. As shown in FIG. 1B, the spool 10 includes a cylindrical primary barrel 12, around which the optical fiber is wound, and first and second flanges 14 and 15 that define outside limits for the fiber being wound onto the primary barrel. In addition, the shipping spool 10 includes a recessed cylindrical lead meter barrel portion 16 (drawn larger than scale) that is integrally formed into the first flange 14. The lead meter barrel portion 16 includes a lead meter flange portion 18. Finally, a lead meter hole 20 is provided in the first flange 14, providing a pathway for optical fiber to be fed between the lead meter barrel 16 and the primary barrel 12. FIG. 1C shows a close-up view of the lead meter hole in the first flange 14.

Under-wrap access on the shipping spool shown in FIGS. 1A–C is created as follows. First, a bulk spool wound with fiber is loaded onto the pay-out side of an OLS machine, and an empty shipping spool of the type shown in FIGS. 1A–C is loaded onto the receiving side of the OLS machine. Second, the end of the fiber is unrolled from the bulk spool and then threaded through the pulleys on the machine to the shipping spool. Third, the end of the fiber is threaded from the inside of first flange 14 of the shipping spool through lead meter hole 20. A length of approximately five to ten meters of fiber, enough for twenty revolutions around the lead meter barrel, is pulled through the lead meter hole 20 and then manually (hand) wound onto the lead meter barrel 16. Once the lead meter barrel 16 has been wound, the end is taped and the OLS machine is started, and optical fiber is automatically wound onto the primary barrel 12 between the first and second flanges 14 and 15 of the shipping spool 10 until a predetermined length of fiber is wound on and again the end is taped.

The five- to ten-meter length of fiber wound onto the lead meter barrel provides a sufficient amount of fiber for measurements, for example, for: (1) optical access for double-ended optical time-domain reflectometer (OTDR) measurements, (2) samples to check other optical and geometric properties, and (3) fiber to be used by the customer for additional optical measurements.

The above-described procedure suffers from a number of disadvantages. First, the procedure, especially the threading and manual wind onto the lead meter barrel, is time-consuming and cumbersome. Moreover, the lead meter requires reaching into a narrow, recessed region. Further, because the lead meter is threaded and wound manually, the winding machine must be stopped and started as each spool is wound. Thus, the prior art spool does not readily lend itself to fully automated winding thereof.

In addition, in a typical prior art system, there is a problem in controlling the tension of the optical fiber at the lead meter barrel. Because the lead meter barrel is wound manually, the tension of the lead meter is controlled solely by feel. Improper tension can result in the fiber having to be rewound. Further, there is a problem controlling the tension of the fiber passing through the lead meter hole.

Figure 2B:
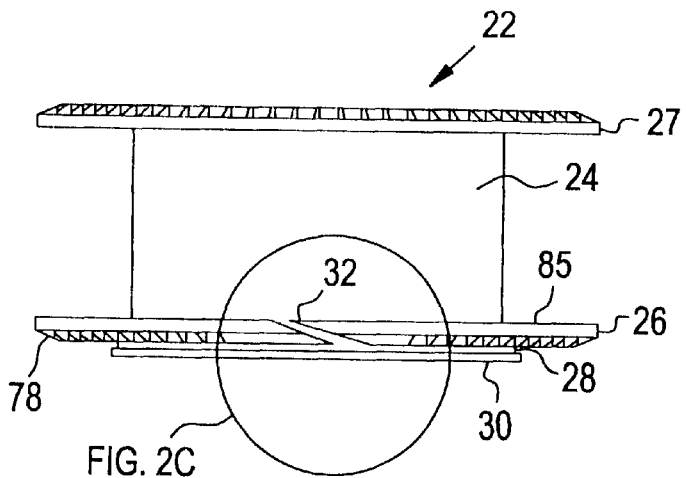
FIGS. 2A and 2B show, respectively, bottom and side views of a first embodiment of a shipping spool according to the invention.
Figure 11:
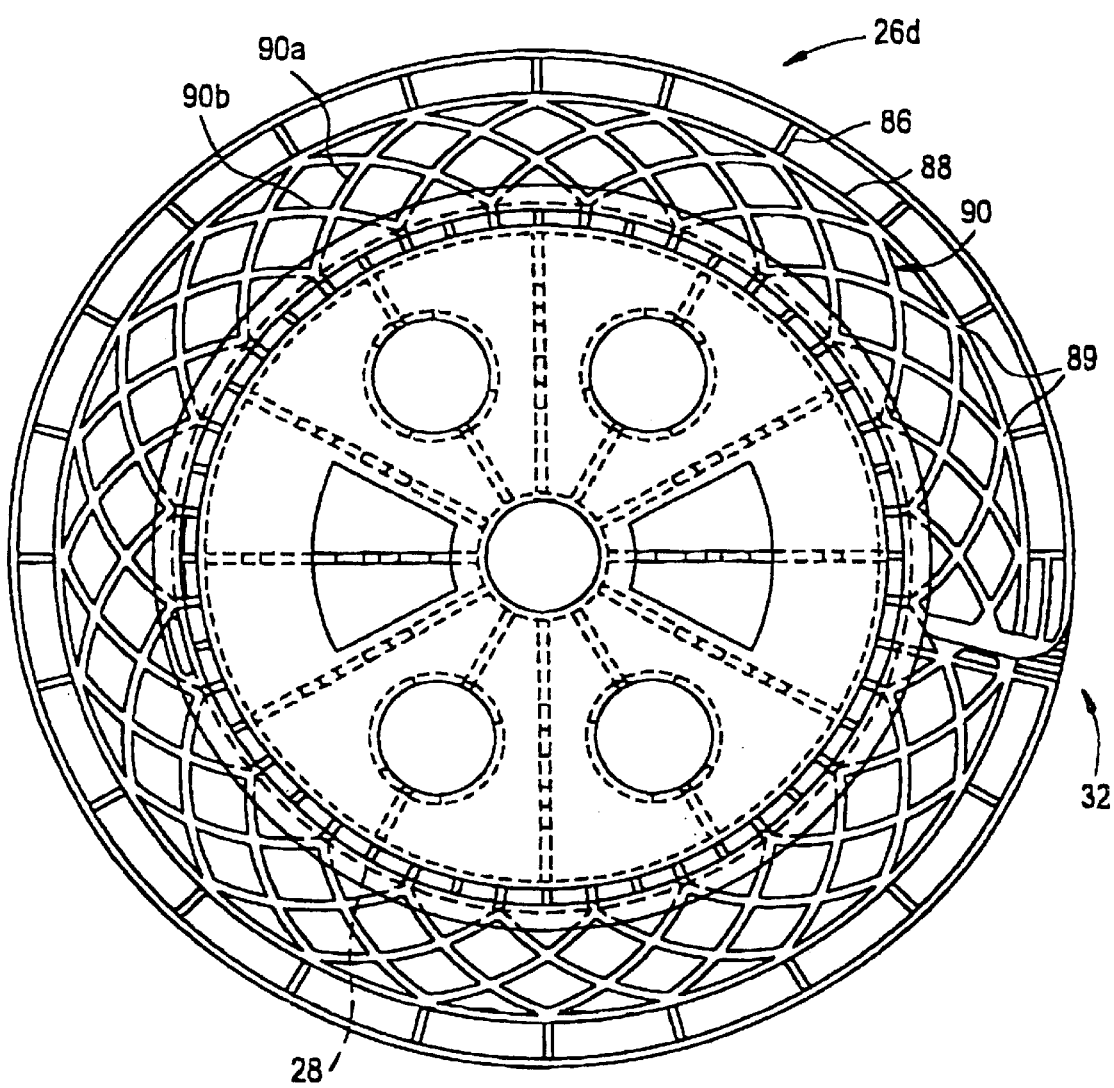
FIG. 11 shows a bottom view of an outboard flange having an alternative rib configuration.

The present invention provides an advantageous winding system that overcomes these drawbacks in the prior art by allowing optical fiber to be wound in an automatic sequence onto both the lead meter barrel portion and the primary barrel portion of a specially designed shipping spool. FIGS. 2A and 2B show, respectively, side and bottom views of a first embodiment of a shipping spool 22 according to the invention. As shown in FIG. 2B, the spool 22 includes a primary barrel portion 24, around which the optical fiber is wound. The outside limits of the fiber wound onto the primary barrel portion 24 are defined by outboard and inboard flanges 26 and 27. In the present embodiment, these flanges are ribbed to combine lightness with strength. FIG. 11, discussed below, shows an alternative embodiment of a rib pattern that may be advantageously used in practicing the present invention.

The spool 22 shown in FIGS. 2A and 2B further includes a lead meter barrel portion 28 around which the lead meter portion of the optical fiber is wound. Unlike the lead meter barrel portion 16 in the prior art shipping spool 10, discussed above, the present lead meter barrel 28 is not recessed, but rather protrudes axially from outboard flange 26. Further, the width of the present lead meter barrel 28 is somewhat greater than that of its prior art counterpart. The lead meter barrel 28 is separated from the primary barrel 24 by the outboard flange 26. The outside limits of the lead meter barrel portion 28 are defined by the outboard flange 26 and a lead meter flange 30. As is apparent from FIGS. 2A and 2B, the lead meter barrel portion 28 and lead meter flange 30 lie along the same longitudinal axis, i.e., are coaxial with, the primary barrel 24 and inboard and outboard flanges 26 and 27.

The shipping spool shown in FIGS. 2A and 2B includes a slot 32 in the outboard flange 26. The slot is angled at less than 90 degrees, and more preferably the slot is angled less than 45 degrees. Most preferably, the slot is angled about 20 degrees with respect to the inner flange face 90. The slot 32 provides a pathway for optical fiber between the lead meter barrel 28 and the primary barrel 24. The slot 32 replaces the lead meter hole found in the prior art spool discussed above. It preferably extends from the surfaces of the primary and lead meter barrels 24, 28 to the outer periphery of the outboard flange 26. In a presently preferred embodiment, the spool is plastic and is injection-molded, with the slot 32 being integrally molded into the outboard flange 26 during the molding process.

As described in greater detail below, the geometry of the slot is designed such that after fiber has been wound onto the lead meter barrel 28 and comes into contact with the slot 32, the fiber is accelerated and traversed through the slot and onto the primary barrel 24 without any interruption in the winding process. The slot is designed such that the outboard flange 26 becomes transparent to the optical fiber as the fiber makes the traverse from the lead meter barrel to the primary barrel. In other words, the slot 32 acts as a cam to accelerate the fiber from one side of the outboard flange 26 spool to the other, thereby providing full access to a discrete portion of the under-wrap that has been wound onto the lead meter barrel 28. This eliminates the need for the manual threading and lead meter winding process used in the prior art.

Figure 2C:
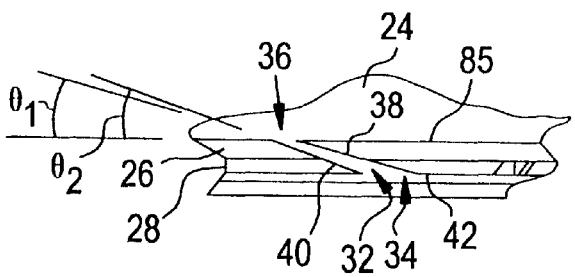
FIG. 2C shows a close-up view of an outboard flange slot in the shipping spool shown in FIGS. 2A and 2B.
Figure 2A:
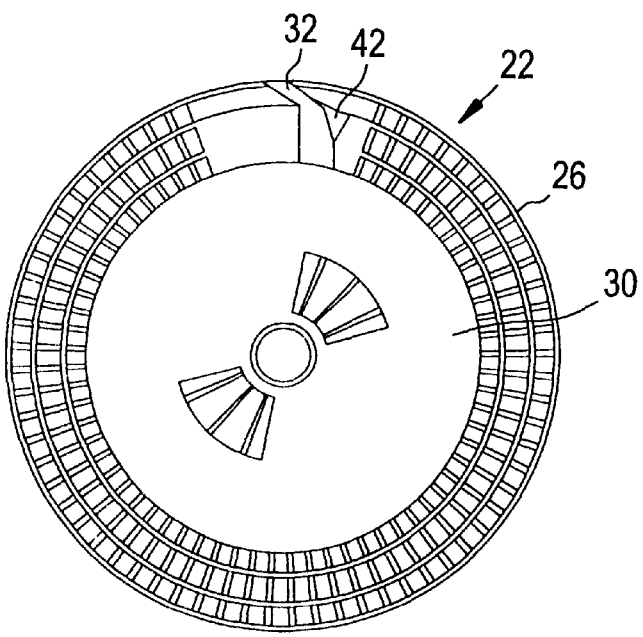

FIG. 2C shows an enlarged view of the slot 32 in the outboard flange 26. As described above, the slot 32 accelerates fiber from the slot's inlet side 34, i.e., from the direction of the lead meter barrel 28, towards the slot's outlet side 36, i.e., towards the direction of the primary barrel 24. The slot 32 is defined by two opposing surfaces, a lead-in surface 38 and a working surface 40. As shown in the illustrated embodiment, the lead-in surface 38 and the working surface 40 are preferably non-parallel with each other. Thus, the inlet side of the slot 34 is larger than the outlet side 36. Preferably, an angle $\theta_1$ of about 15 degrees is provided on the lead-in surface 38 measured from the flange inboard surface 85. A larger angle $\theta_2$ of about 20 degrees is provided on the working surface 40, again measured from the inboard face 85.

As its name implies, the lead-in surface 38 guides the optical fiber into the slot 32 at winding speed in a controlled manner that minimizes tension spikes. As shown in FIG. 2A, the lead-in surface 38 may include a tapered portion 42 that facilitates the lead-in function. Similarly, as its name implies, the working surface 40 laterally accelerates the fiber through the slot. As described in greater detail below, the rotation of the shipping spools causes the optical fiber to be urged against the working surface 40, thereby inducing the acceleration.

The operation of the present spool 22 can better be understood with reference to FIGS. 3A–F, which show the shipping spool 22 at different stages during the winding process. For the purposes of illustration, the lead meter barrel 28 in these figures has been drawn with a greater than normal width.

The winding process is commenced by mounting the empty spool onto a rotatable spindle assembly and affixing the end of the optical fiber 44 to the lead meter barrel 28, proximate to the lead meter flange 30. In an OLS process, this can be accomplished by manually taping the end of the fiber 44 to the lead meter barrel 28. Once the end of the fiber 44 is attached to the lead meter barrel 28, the spool 22 is rotated, and fiber 44 begins to wind onto the lead meter barrel 28.

Figure 3A:
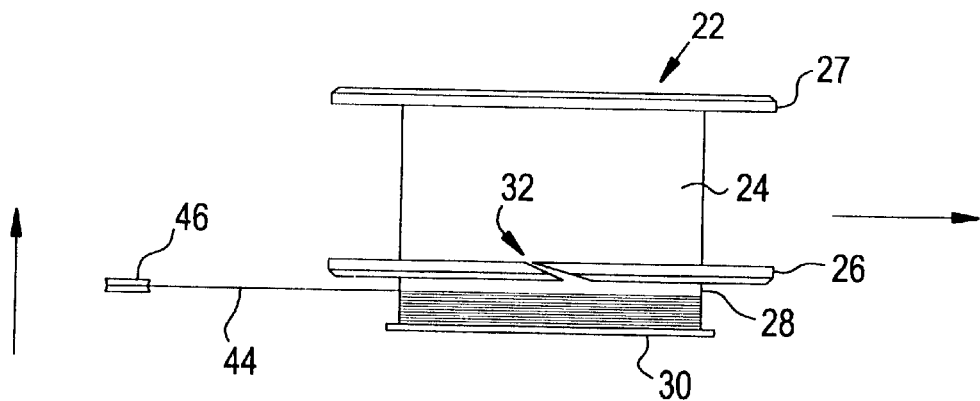
FIGS. 3A–E show a side view of a shipping spool according to the invention at various points during the winding process.

FIG. 3A shows a side view of the spool 22 in the middle of the winding of the lead meter segment of optical fiber 44 onto the lead meter barrel 28. The lead meter barrel 28 is located at the bottom of the spool 22, as shown. The terms side and bottom are illustrative only as used herein and it should be recognized that the spools may be wound in any orientation practicable, and preferably with the axial axis being horizontal. The optical fiber 44 is fed to the spool by means of a flying head assembly 46. As the fiber 44 winds onto the lead meter barrel 28, the flying head 46 moves upward at a rate that has been calculated with respect to the diameter of the spool 22, the width of the fiber 44, and the speed at which the spool 22 is rotated, such that the combined rotation of the spool 22 and motion of the flying head 46 cause optical fiber 44 to be wound onto the lead meter barrel 28 and primary barrel 24 in an even spiral, in which each row of the spiral immediately abuts the previous row. The distance between consecutive rows in the spiral is known as the winding "pitch," which can be adjusted by changing the speed at which the flying head 46 moves upward or downward (or back and forth, depending upon the orientation of winding) relative to the rotating spool 22. During this portion of the winding process, the angle of the fiber 44 relative to the flying head 46 remains substantially flat, approximating 180 degrees, as the velocity of the flying head 46 is approximately equal to the fiber transverse velocity, i.e., the speed at which the spiral of optical fiber 44 progresses up the length of the lead meter barrel 28.

Figure 3B:
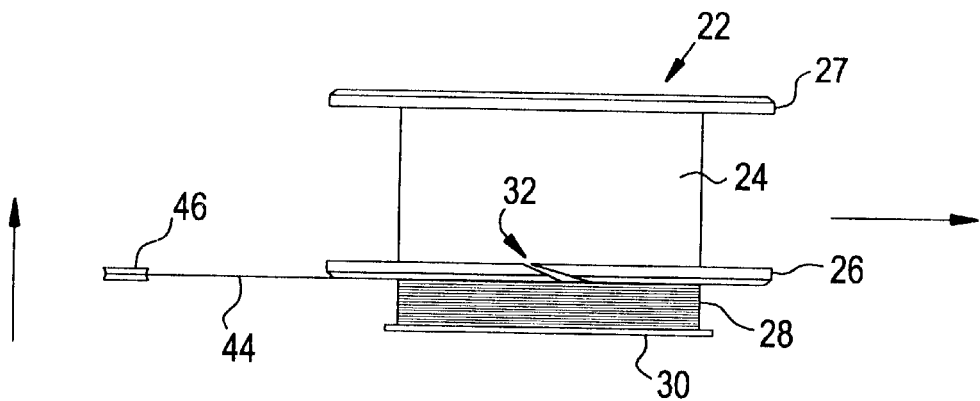

The optical fiber 44 continues to be wound onto the lead meter barrel 28 until, as shown in FIG. 3B, the flying head 46 has advanced to the point at which the optical fiber 44 makes contact with the outboard flange 26. At this point, the lead meter barrel 28 has been fully wound with optical fiber 44.

Figure 3C:
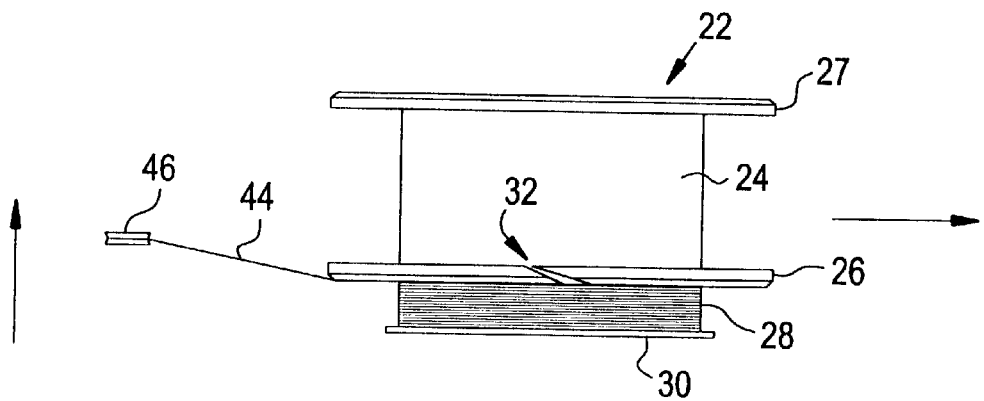

The flying head 46 continues to move upward, but the fiber transverse velocity stagnates as the spiral progression of the fiber 44 wound onto the lead meter barrel 28 is temporarily blocked by the outboard flange 26. Thus, as shown in FIG. 3C, the flying head 46 has continued to advance, but, because of the presence of the outboard flange 26, the fiber 44 being wound onto the lead meter barrel 28 now lags behind the flying head 46.

As the flying head 46 traverses beyond the face of the outboard flange 26, the fiber 44 is urged against the tapered lead-in portion 42 of the slot's lead-in surface 38. The lead-in portion 42 must be long enough and sufficiently tapered so that the fiber 42 does not "slip over" the slot 32. The working surface 40 of the slot 32, i.e., the surface of the slot opposite the lead-in surface 38 is configured such that the fiber 44 is accelerated through the slot 32 to the other side of the outboard flange 26 with an acceptably low level of impact to fiber tension and coating. Alternative slot geometries are discussed further below.

Figure 3D:
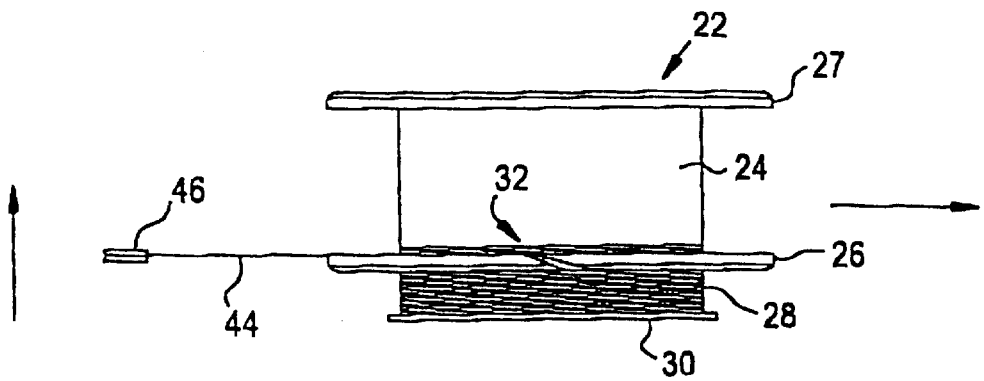

In FIG. 3D, the optical fiber 44 has been accelerated through the slot 32 and onto the primary barrel 24. Because of the acceleration to the fiber 44 imparted by the slot 32, which functions essentially as a cam, the fiber 44 being wound onto the spool 22 now leads the flying head 46, which has continued to move upward at a constant rate of speed. Because the flying head 46 now lags behind the fiber 44 being wound onto the primary barrel 24, fiber 44 now begins to build up at the slot outlet side of the outboard flange 26.

Figure 3E:
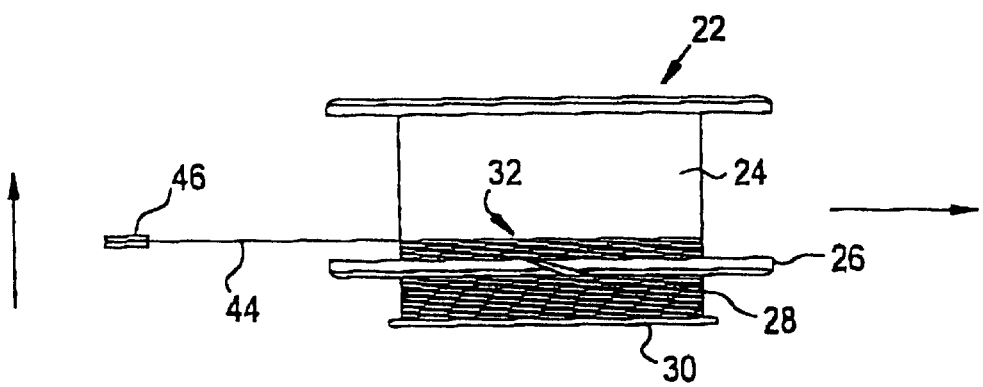

As shown in FIG. 3E, the buildup of fiber 44 continues until the flying head 46 "catches up" with the fiber 44. At this point, a normal wrap process commences, in which the flying head 46 moves back and forth between the outboard flange 26 and inboard flange 27. Because of the angle and geometry of the slot 32, optical fiber 44 cannot be drawn back into the slot 32 once the normal wrap has begun.

Figure 4:
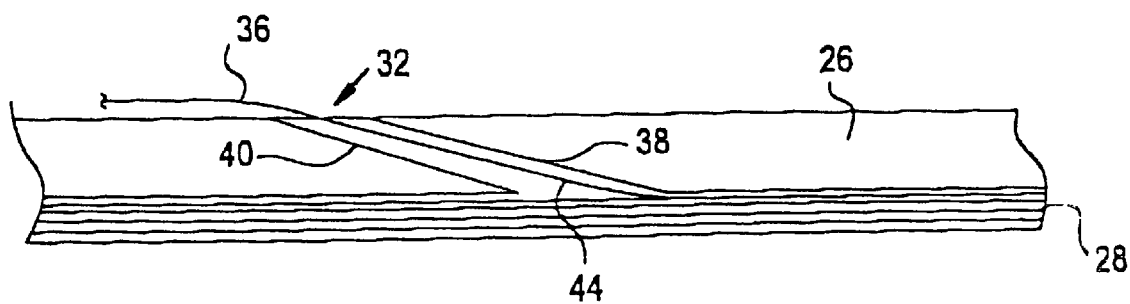
FIG. 4 shows a close-up view of an outboard flange slot at the point at which the fiber has completed its traverse from the lead meter barrel to the primary barrel.

FIG. 4 shows a close up view of the slot 32 at the transition point, i.e., the point at which the fiber 44 has been accelerated by the slot 32 through the outboard flange 26.

It will be appreciated that the functioning of the slot 32 is essentially the same when the fiber source is stationary and the rotating spool 22 is moved up and down along its longitudinal axis.

In summary, once the optical fiber 44 has been attached to the lead meter barrel 28, the lead meter segment of the fiber 44 is wound onto the lead meter barrel 28 automatically until the optical fiber 44 comes into contact with the outboard flange 26, at which point the fiber 44 is accelerated through the slot 32 and then onto the primary barrel 24 of the spool 22. Thus, the need to manually wrap twenty turns of fiber onto the lead meter barrel, as typically required in the prior art, is completely eliminated, thereby significantly increasing the efficiency of the manufacturing process. In addition, the present system has a number of other advantages, discussed further below.

Figure 5A:
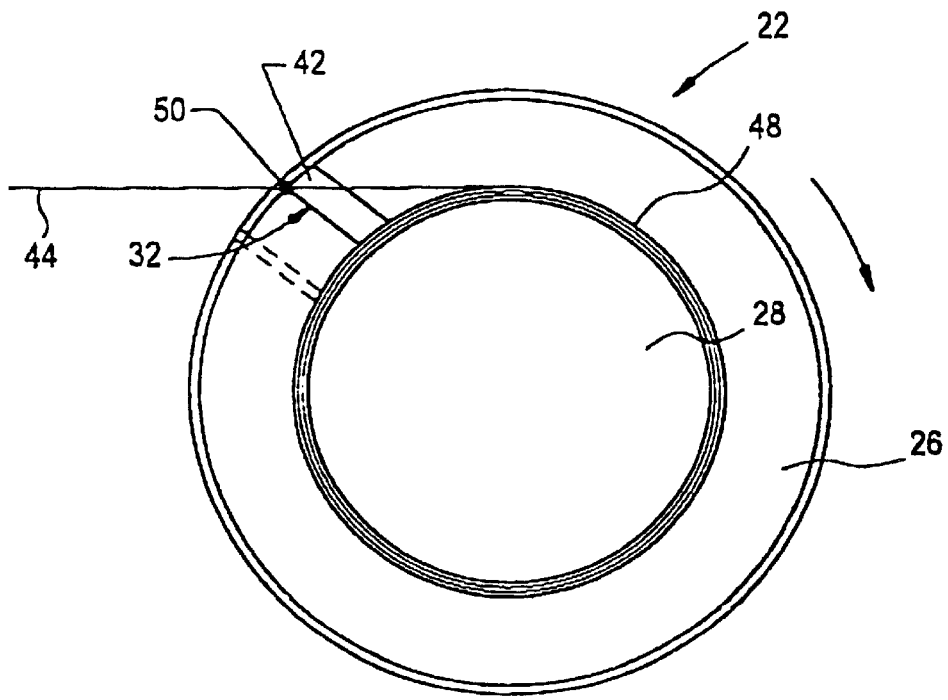
FIGS. 5A–C show a bottom view of a shipping spool according to the invention illustrating various operational parameters of the spool.

The present shipping spool 22 has a number of operational parameters, which are illustrated in FIGS. 5A–E. FIG. 5A shows a bottom view of a shipping spool 22 according to the present invention, with the lead meter flange removed for the purpose of illustration. The lead meter barrel 28 is preferably covered with a layer of elastomeric, foam, or other resiliently cushioning material 48 to prevent damage to the fiber 44. In FIG. 5A, the fiber 44 has just been drawn to the "slot entry point" 50 by the immediately adjacent tapered lead-in portion 42. As its name implies, the slot entry point 50 is the point at which the fiber 44 actually enters the slot and begins its acceleration. As shown in FIG. 5A, the slot entry point 50 is proximate to, but not abutting, the circumference of the outboard flange 26.

Figure 5B:
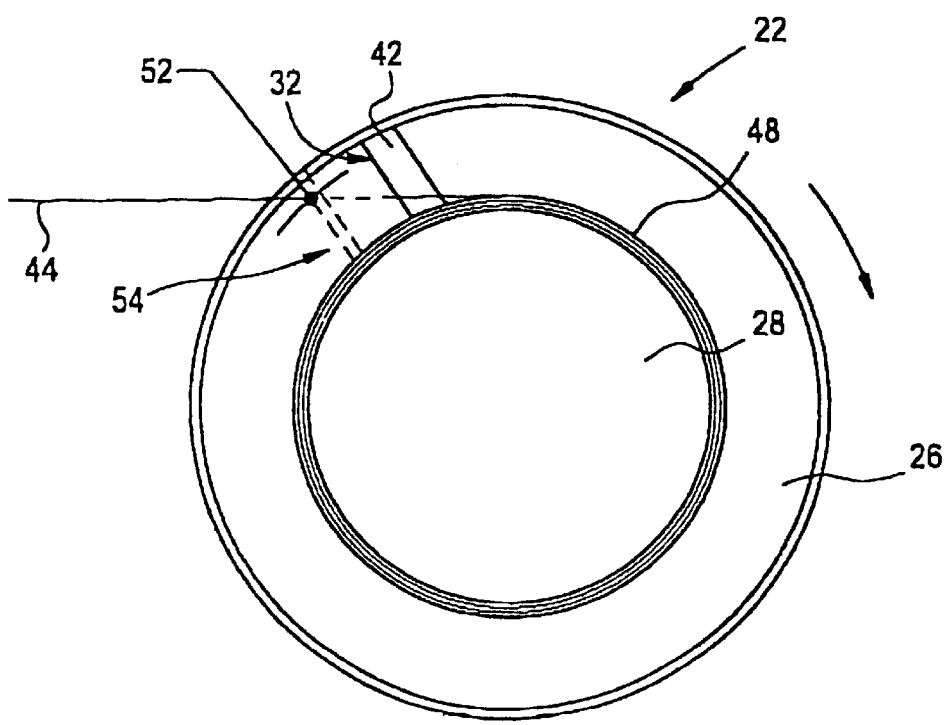

In FIG. 5B, the rotation of the spool 22 has continued, and the optical fiber 44 has now been accelerated through the slot to a "slot exit point" 52, i.e., the point at which the fiber 44 exits the slot 32. The region of the outboard flange 26 immediately abutting the slot exit point 52 comprises a "slot lead-out area" 54. As shown in FIG. 5B, the slot exit point 52 is located at a point deeper within the circumference of the outboard flange 26 than the slot entry point 50. Once the fiber 44 has exited the slot 32 and the slot exit point 52, it is then wound onto the primary barrel of the spool.

Figure 5C:
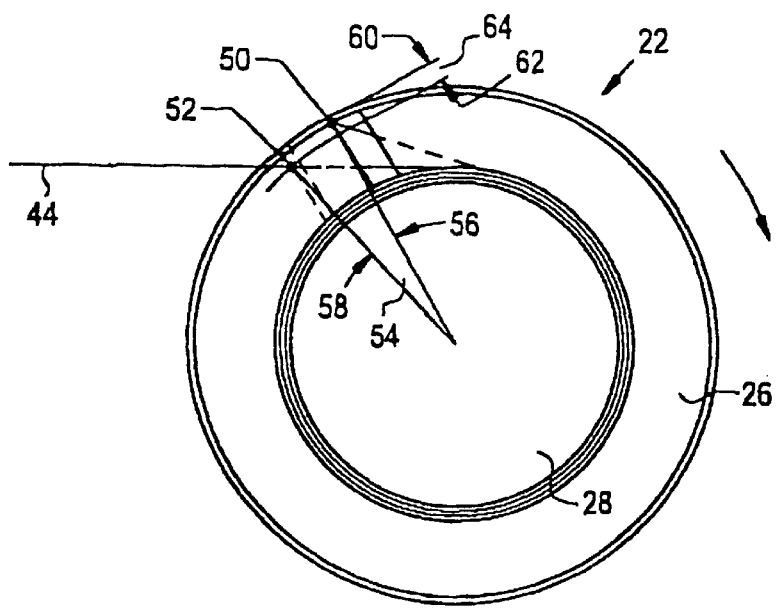

FIG. 5C shows the relationship between the slot entry point and the slot exit point. As shown in FIG. 5C, an acute angle 54 is formed by a first radius 56 including the slot entry point 50 and a second radius 58 including the slot exit point 52. This angle 54 is known as the "slot included angle." Further, the measured difference between the depth of the slot entry point 60 and the slot exit point 62 is known as the "depth of acceleration area" 64.

Figure 5D:
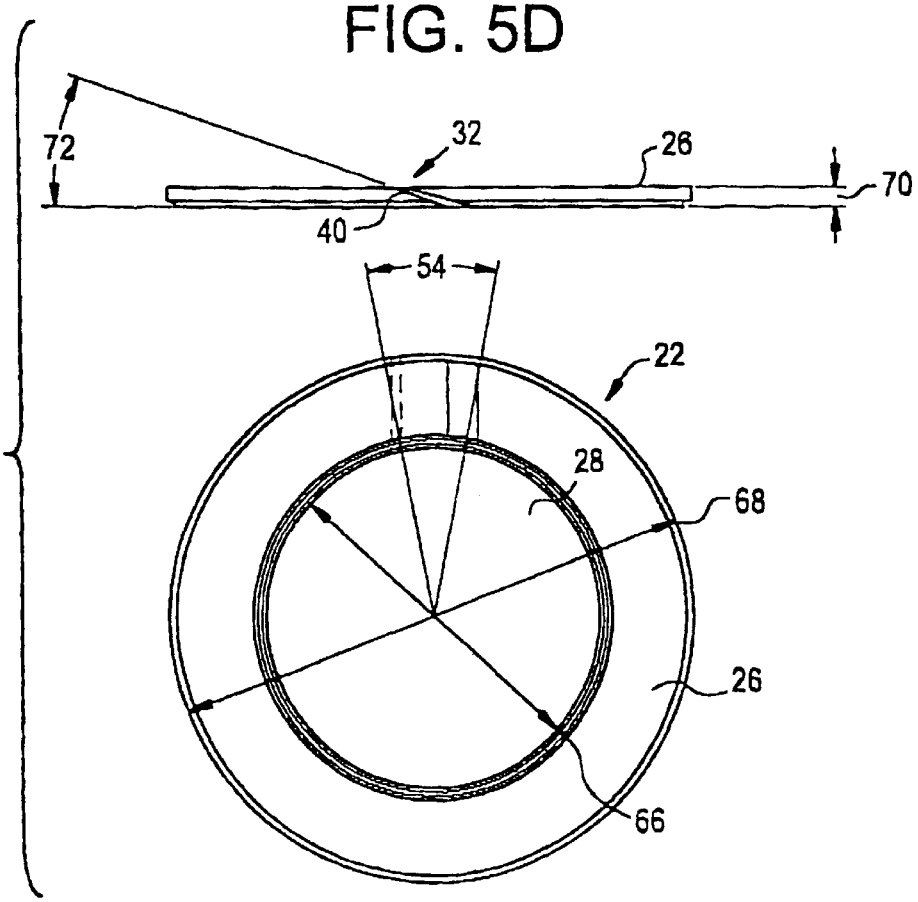
FIG. 5D is a composite side and bottom view illustrating, among other things, the "slot included angle" parameter.

FIG. 5D is a composite side and bottom view showing the relationship between the slot 32 and the slot included angle 54. In addition, FIG. 5D illustrates three additional parameters, the lead meter barrel diameter 66, the outboard flange diameter 68, and the outboard flange thickness 70. Also illustrated is the "slot pressure angle" 72 ($\theta_2$), which is the angle formed by the slot's working surface and the outboard flange. As shown in FIG. 5D, the slot pressure angle is less than 45 degrees.

One important operational parameter is the fiber line speed, which, in turn, dictates spool rotational speed. Another operational parameter is the flying head traverse velocity, which is a function of the fiber wrap pitch. For the flange, operational parameters include the slot's included angle, discussed below, and the flange thickness.

Rotational speed, slot included angle and flange thickness determine the traverse event timing and all kinematic and dynamic fiber responses, such as traverse time, velocity, acceleration, and changes in fiber tension. Flying head velocity at flange traverse and flange thickness dictate the probability of a fiber strike to the slot inlet edge, and also control the number of fiber turns that build up while the flying head is passing abeam of the flange and lagging behind fiber deposition occurring at the inside of the flange.

The slot 32 is engineered to be unidirectional for fiber 44 traversing the outboard flange 26. If, during normal wrapping, the fiber 44 makes contact with the outlet side of the slot 36, fiber damage will not occur, nor will the fiber 44 be drawn into the slot 32.

Figure 6:
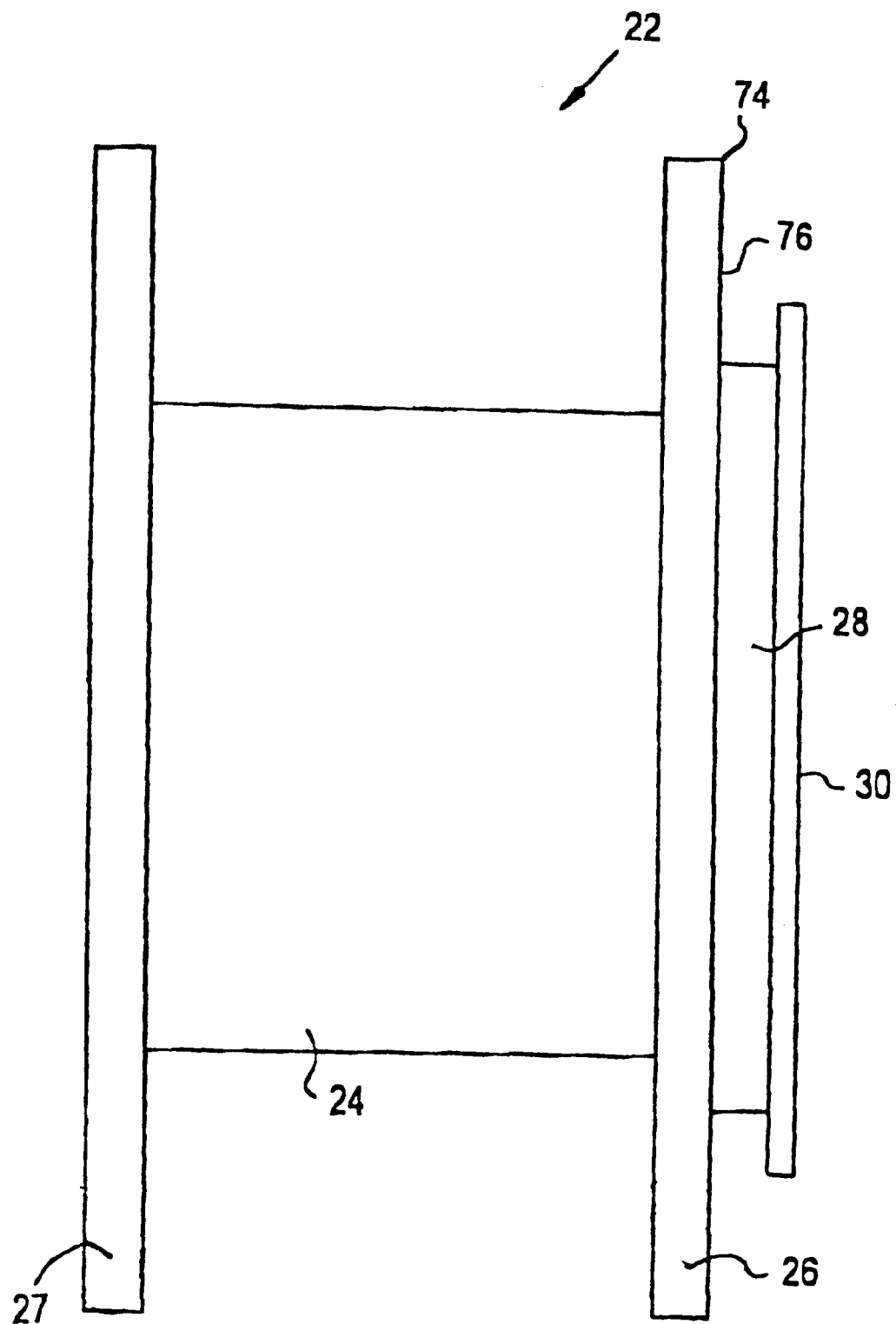
FIG. 6 is a side view of a flat-flange embodiment of a shipping spool according to the invention.

Several alternative embodiments have been developed for the slot 32 and the outboard flange 26. Two basic slot configurations have been developed for use with a flat, i.e., non-tapered, outboard flange, such as that shown in FIG. 6. As shown in FIG. 6, the outboard flange 26 has a square corner 74, and its outside face 76 is flat.

Figure 7A:
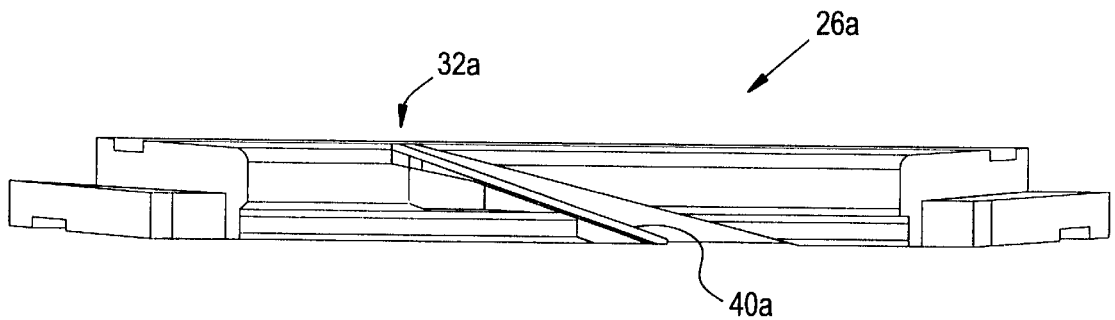
FIGS. 7A and 7B show, respectively, side and bottom perspective views of a "constant velocity" outboard flange slot according to the invention.
Figure 7B:
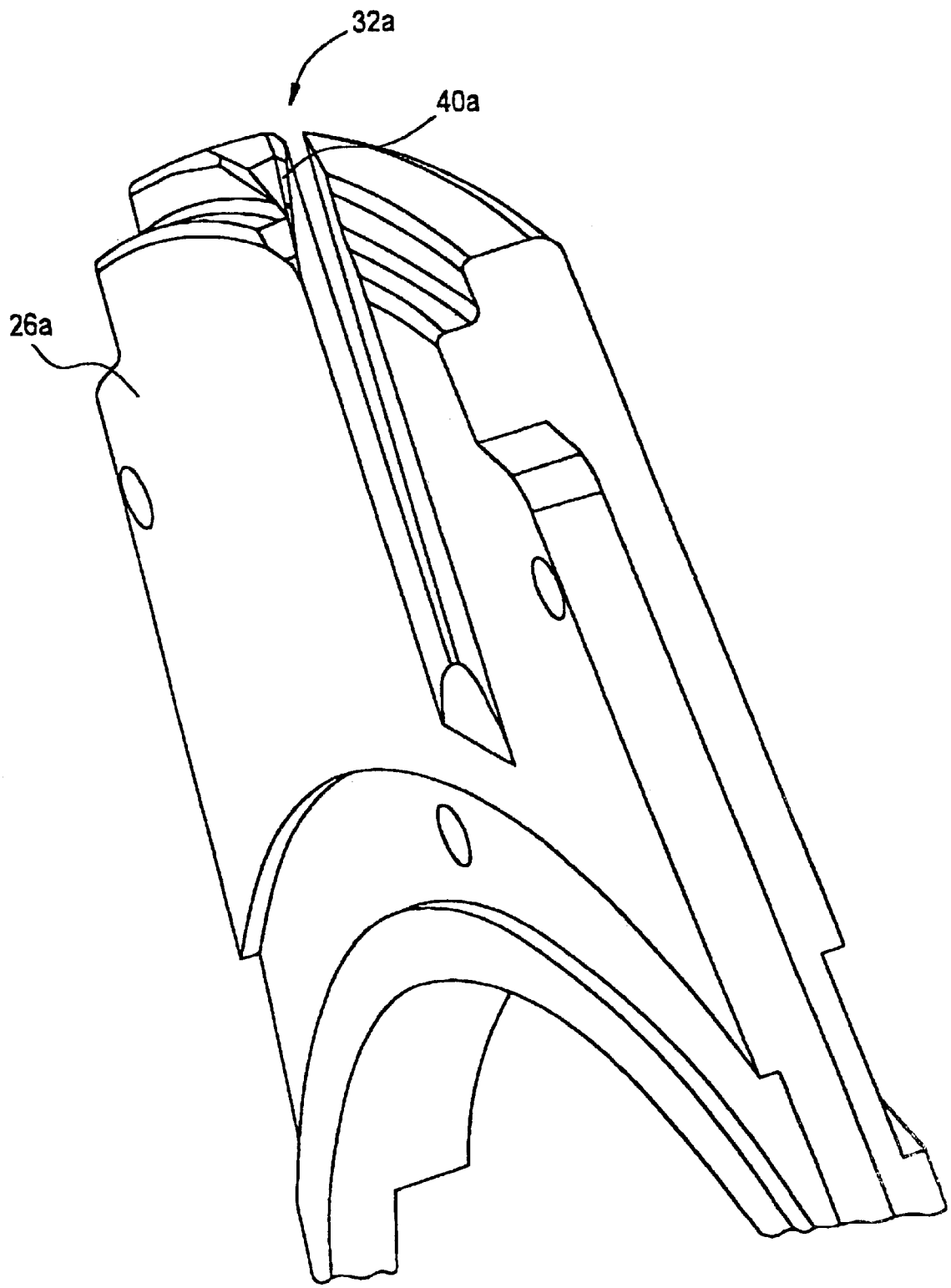

The first embodiment is a so-called "constant velocity" slot, which is the slot in its simplest form. This slot is illustrated in FIGS. 7A and 7B, which show, respectively, a side view and a partial perspective view of multi-piece spool design including an outboard flange 26a incorporating a constant velocity slot 32a. The multi-piece design was utilized to test various slot configurations. Thus, although shown as a segment of the flange, in practical implementation, the slot would preferably be formed in an integral circular-shaped flange component similar to that shown in FIG. 2A. The working surface 40a of this slot 32a is simply a planar surface that cuts through the outboard flange 26a of the spool. Radii at the edges of the cut act as surfaces that guide the fiber through the slot. Once the fiber engages in the slot 32a, the fiber is quickly accelerated to its maximum velocity and then travels at this velocity until the fiber completes its traverse through the outboard flange 26a. In this slot configuration, the fiber may experience high accelerations as it enters the slot area. These high accelerations may create tension spikes in the fiber that can significantly impair tension control in the fiber as it is wound. However, it has been determined through experimentation that the tension spikes and loss of tension control with this embodiment are acceptable, and therefore this configuration is a viable means for creating lead meter access.

Figure 8A:
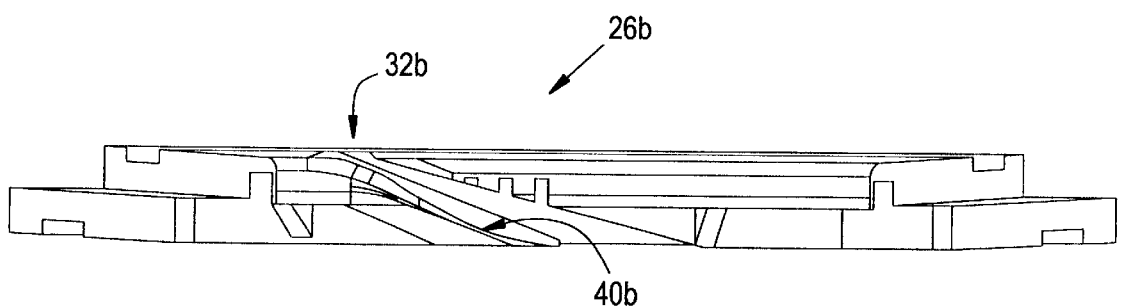
FIGS. 8A and 8B show, respectively, side and bottom perspective views of a "controlled acceleration" outboard flange slot according to the invention.
Figure 8B:
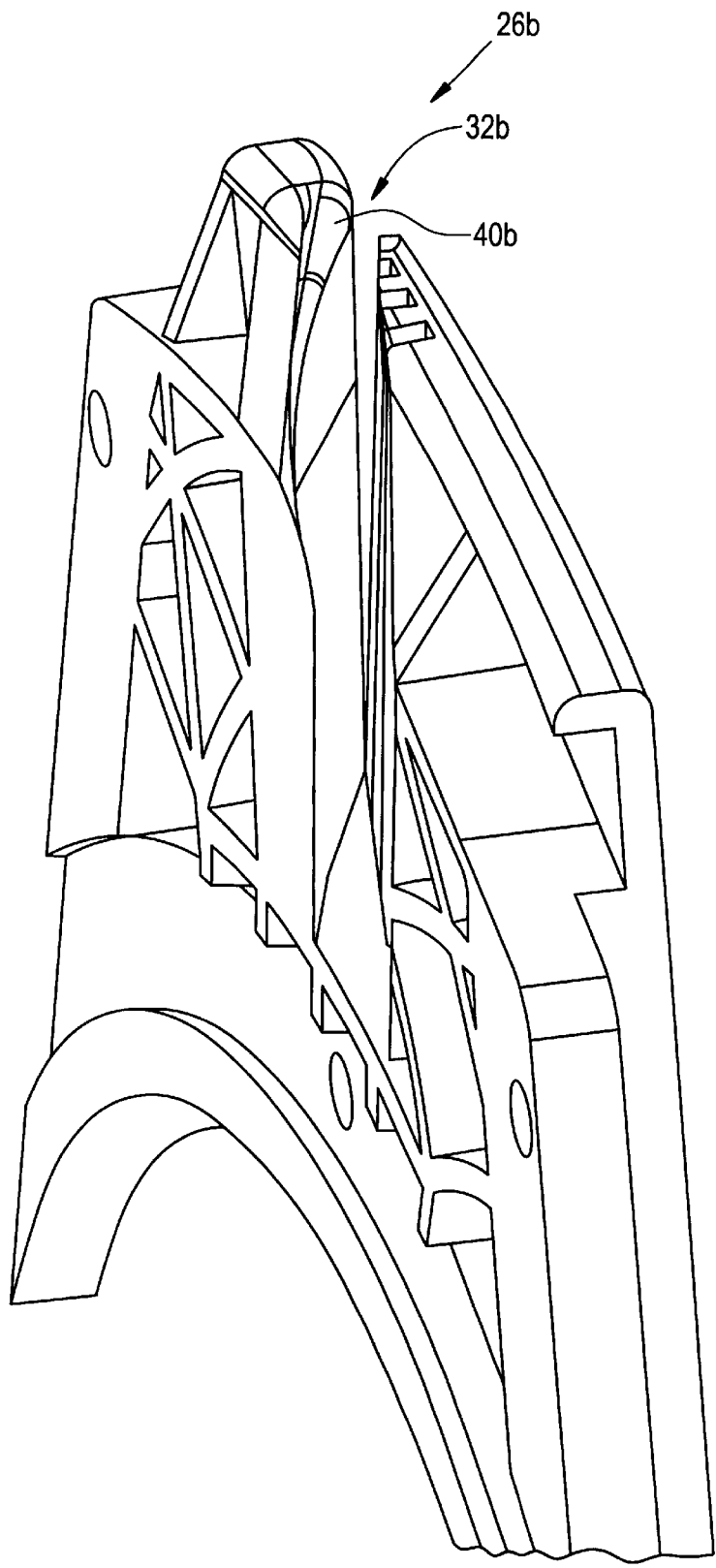

FIGS. 8A and 8B show, respectively, a side view and a partial bottom perspective views of a multi-piece spool design including an outboard flange 26b incorporating a "controlled acceleration" slot 32b, in which the working surface 40b comprises two parabolic curves arranged in an "S" configuration 40b. The first curve initially presents a more gradual angle to the fiber than does the constant velocity slot shown in FIGS. 7A and 7B, thereby reducing the acceleration of the fiber at the slot entry point. The parabolic curves in the working surface 40b operate to increase the duration of the fiber acceleration compared with that of the constant velocity slot. However, although its duration is greater, the magnitude of the acceleration is lower. The second parabolic curve, which is curved in a direction opposite to that of the first curve, decelerates the fiber before it exits the slot 32b. Minimizing the exit velocity aids in maintaining tension control of the fiber.

As described above in connection with FIGS. 3D and 3E, a system incorporating the present invention can lead to a buildup of fiber 44 on the primary barrel side 24 of the outboard flange 26. The buildup is caused by the action of the slot 32, which accelerates the fiber 44 through the flange 26 at a rate of speed that is greater than the upward movement of the flying head 46. Because the optical fiber 44 being wound onto the spool 22 reaches the primary barrel side 24 of the outboard flange 26 before the flying head 46 "catches up," several turns of fiber 44 are wound onto the primary barrel 24 at the outboard flange 26 before a normal wrap can resume.

The buildup of fiber on the primary barrel 24 at the outboard flange 26 can result in microbending of the fiber 44, as additional layers of fiber 44 are wound onto the primary barrel 24 on top of the buildup. This can cause loops to form as the fiber piles up. Micro-bending of the fiber can cause attenuation losses, which are detected by OTDR testing. Subsequent layers of fiber which are then wound on top of these first wraps tend to exacerbate the problem due to the increased pressure on the fiber that are piled up. The presence of such losses exceeding a predetermined level will require that the fiber be rewound before it can be shipped to the customer. An additional problem with this buildup is that the pile of fiber can further influence the wrap quality of remaining passes of fiber. The buildup can be amplified as subsequent layers of fiber are deposited.

One approach to solve this problem is to wind the fiber at a pitch that approaches the flange thickness, which is typically ⅜". However, the ability to wind at the necessary pitch becomes increasingly difficult as the machine increases the winding speed. Thus, alternative geometries have been developed for the outboard flange 26 and the slot 32 to address the buildup issue.

One embodiment of the spool 22 to address the buildup issue includes a taper on the outboard flange 26. This taper 78 is illustrated in FIG. 2B, discussed above. The use of an outboard flange 26 with a tapered outside face reduces this buildup problem. This taper 78 functions to delay fiber entry into the slot 32. The fiber buildup is then biased to the lead meter side 28 of the spool flange 26. With the buildup occurring on the outside of the spool, i.e., on the lead meter barrel 28, attenuation issues can be reduced since the fiber is not subjected to the pressure of a pack being wound on top of it. Thus, the use of a tapered flange is preferred to a flat, non-tapered flange, for creating the lead meter with minimal losses and simplicity of equipment design.

Figure 9A:
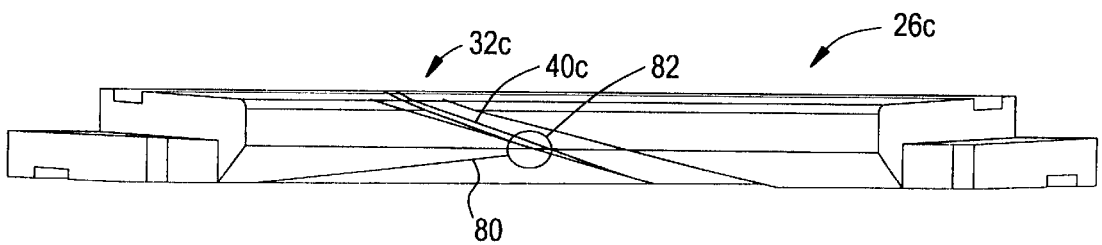
FIGS. 9A–C show, respectively, side, bottom perspective, and bottom views of a "delayed entry" outboard flange slot according to the invention.
Figure 9B:
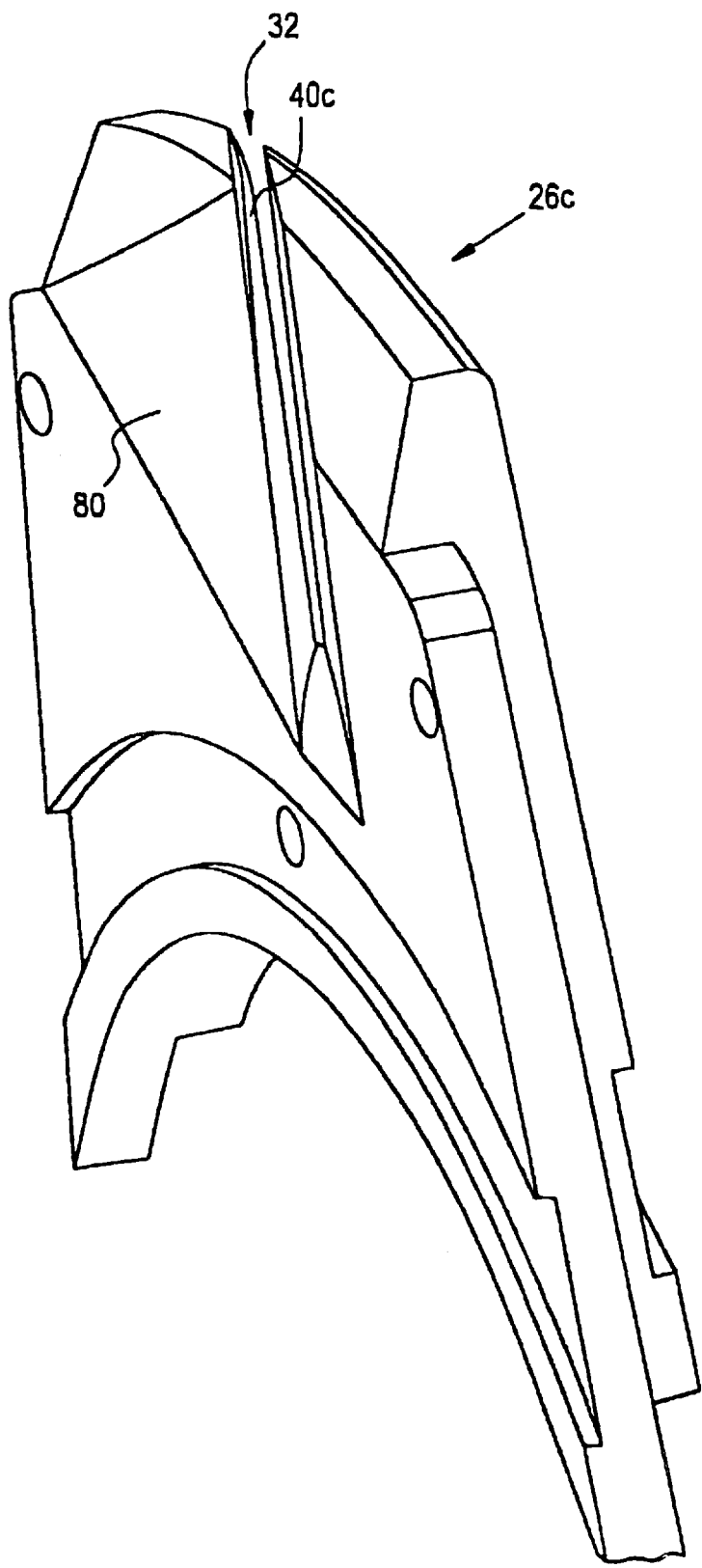
Figure 9C:
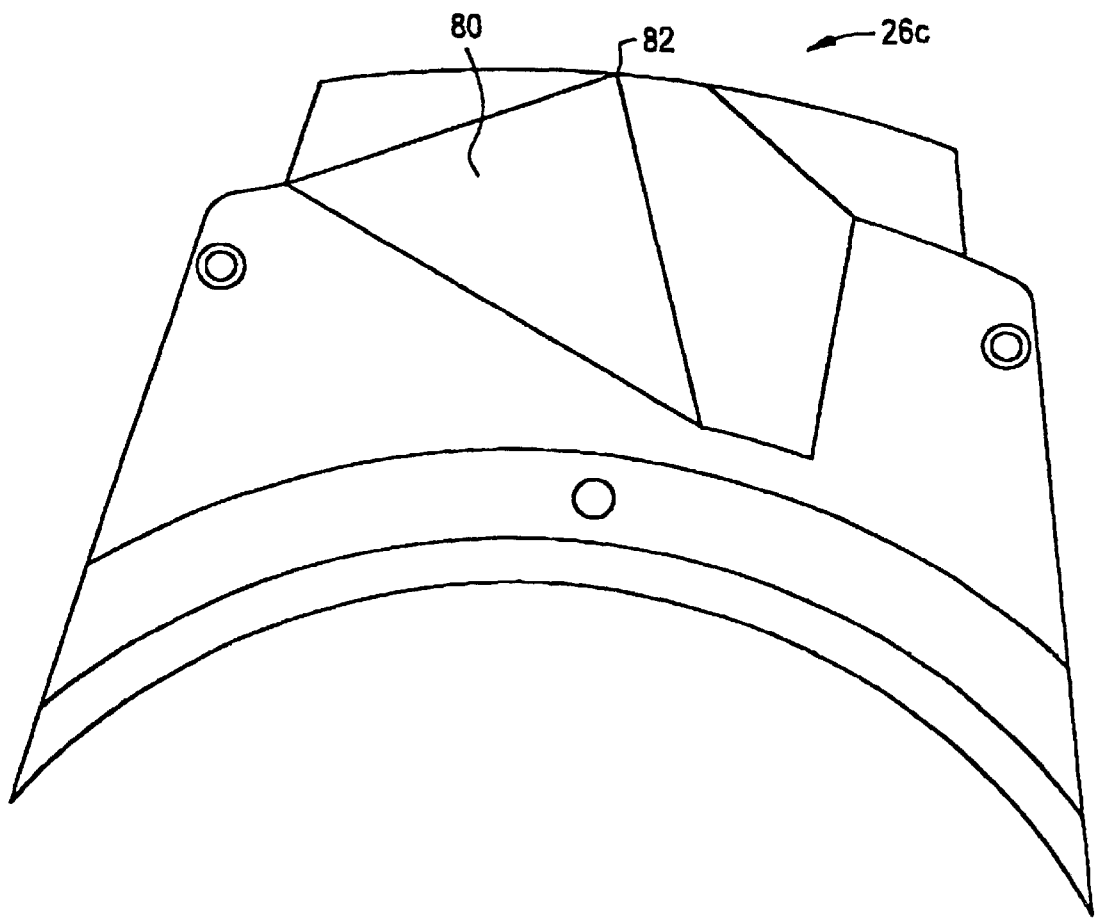

In addition to using a tapered flange design, it is also possible to bias the buildup towards the lead meter barrel by using a modified slot design. FIGS. 9A–C show, respectively, side, bottom perspective, and bottom views of an outboard flange 26c incorporating such a design. As shown in FIGS. 9A–C, a section of the slot's working surface 40c has been cut away to form a deflecting surface 80. This cutaway portion serves to move the slot engagement point 82 closer to the primary barrel, thereby allowing the flying head 46 to advance for several turns beyond the point at which the optical fiber 44 would normally enter the slot 32c. Further, the deflecting surface 80 created by the cutaway portion serves to deflect optical fiber 44 approaching the working surface until the engagement point 82 has been reached. If desired, the delayed entry slot can be combined with a tapered flange design.

Other arrangements may be used to address fiber buildup at the primary barrel side of the outboard flange. For example, it is possible to use machine controls to allow flying head accelerations and velocities at the outboard traverse point sufficient to create a maximum buildup of less than two fibers at speeds of greater than 25 m/s. Mechanisms for reducing this buildup further are possible through additional enhancements to the machine controls. In addition, an "assist" device, with a low mass and high acceleration, can be used in conjunction with the traverse to momentarily accelerate the final pulley, and fiber, over the width of the flange. Alternatively, the fiber could be retained momentarily by a solenoid-driven actuator until the final pulley is beyond the flange, then released.

In a more complex system, lateral motion of the fiber can be timed according to the radial position of the rotating spool, such that the fiber enters the slot without contacting the flange or the slot surfaces. This technique, while readily practicable at slower speeds, becomes increasingly difficult at higher speeds. The requirements of the system are dictated by the size (i.e., width and angle) of the slot, and the line speed of the equipment.

U.S. patent application Ser. No. 09/042,489, filed Mar. 16, 1998 (which claims the benefit of Provision Application Serial No. 60/041,371, filed Mar. 25, 1997), and assigned to the assignee of the present application, the disclosure and drawings of which are hereby incorporated by reference in their entirety, describes an automated draw winder that can advantageously be combined with the present invention. The described automated draw winder includes a drawing machine in which, after a break in the optical fiber has occurred, the fiber continues to be drawn by a tractor, and is collected using an aspirator. After a series of motion control sequences, the aspirator, which maintains tension on the fiber, introduces the fiber to a snagger tooth, proximate to the spool flange.

Figure 10A:
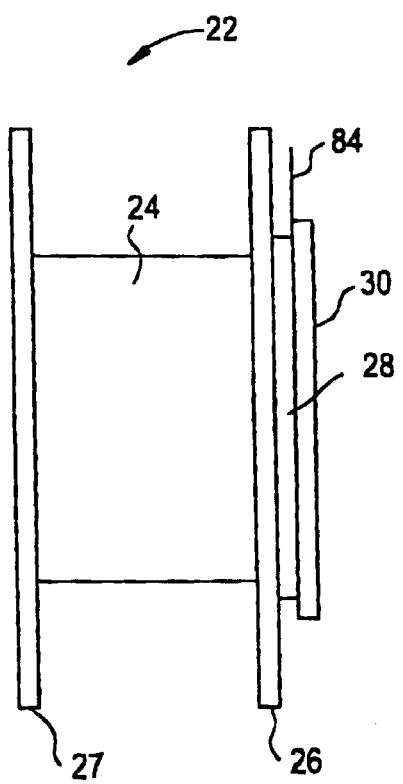
FIGS. 10A and 10B show, respectively, side and bottom views of a shipping spool according to the invention, in which the lead meter end of the optical fiber has been captured by a snagger tooth.
Figure 10B:
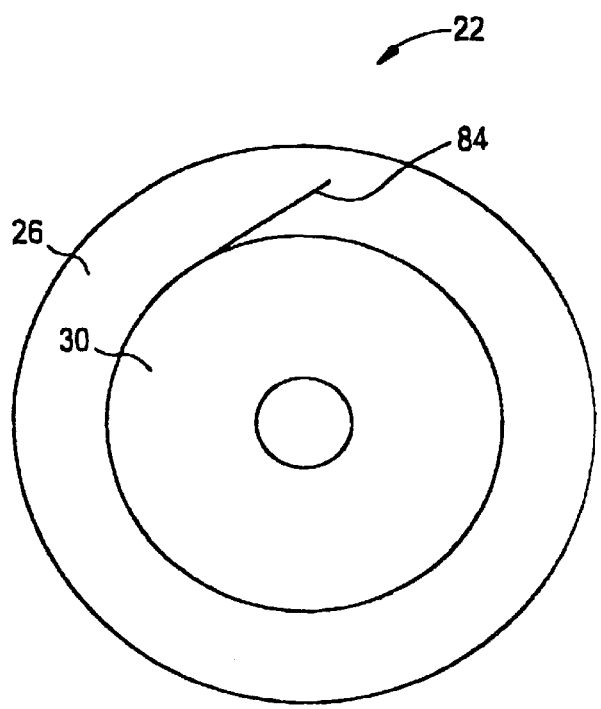

It is possible to use a spool according to the present invention in conjunction with the automated draw winder to create an automated system. After each shipping spool has been wound, the machine can automatically break the fiber, capture the fiber end as described above, and affix it to the snagger tooth again. FIGS. 10A–B show, respectively, side and bottom views of a shipping spool having a protruding fiber end 84 that has been trapped by a snagger tooth.

Once the fiber end 84 has been snagged, the optical fiber is wound onto the lead meter barrel 28, accelerated through the slot, and then wound onto the primary barrel 24, as described above. After the shipping spool has been completely wound, the fiber is then cut. The loose end is then collected using the aspirator as a new spool is moved into position for winding.

The present system provides a number of advantages in addition to those described above. The geometry of fiber entry onto the primary barrel from the lead meter barrel reduces losses associated with microbending effects inherent to typical prior art spool and winding processes. In a typical prior art system, the small lead meter hole and lack of tension control when manually winding the lead meter often results in excessive microbending. This microbending, in turn, primarily causes coupling losses, a type of attenuation loss, to be detected by OTDR testing. Currently, the remedy for this inability to "peak" the OTDR due to microbending is to unwind the entire lead meter and relieve the bending stresses. The slotted spool according to the present invention mitigates this problem by utilizing a gradual transition of the fiber from one side of the outboard flange to the other, with a substantially reduced risk of microbending, and by application of a controlled tension on the fiber when the lead meter is wound.

Further, the present invention facilitates the automation of lead meter removal. Through programming of the winding machine controls, several layers of fiber can be deposited onto the lead meter barrel before the fiber passes through the slot in the spool outboard flange. The net effect is that the first layer is over-wrapped and retained. This winding pattern can be advantageously combined with a snagger tooth arrangement, in which an end of the optical fiber 84 extends from the barrel of the lead meter area to a snagger tooth. This combination facilitates the automation of lead meter removal in two ways. First, the lead meter end of the fiber protrudes from the barrel for easy location using automated equipment. Second, the over-wraps on the lead meter barrel retain the fiber and allow simple removal of the fiber by pulling on the free end to release the fiber from the snagger tooth. The over-wraps prevent the fiber from unraveling as the end is pulled.

Another advantage of the present system arises during the on-site installation of the fiber. It is normally standard procedure for fiber cablers to cut the fiber at the point that it exits the lead meter hole. This is to prevent high-tension breaks, i.e., where the fiber passes through the lead meter hole, at the completion of the processing of the fiber. Many cabling lines are not automatically stopped before the spool is exhausted. The slotted flange spool, with its external, integrally formed lead meter barrel, eliminates the need to cut the fiber, as the fiber can be unwound out of the slot and off of the lead meter barrel. This technique has two benefits. First, it takes less time to prepare a spool for processing. Second, there is less damage to the spool due to cuts.

A further advantageous feature of the presently disclosed slot is that, unlike other prior art slots, such as that described in U.S. Pat. No. 4,696,438, it minimizes exposure of the side of the wound fiber pack to the elements. The angular penetration of the slot into the spool flange helps protect the fiber pack.

Further, the present slot technique can also be used in a more conventional "bulk-spool" mode as well. For example, previously U.S. patent application Ser. No. 09/042,489, filed Mar. 16, 1998 (which claims the benefit of Provision Application Serial No. 60/041,371, filed Mar. 25, 1997), discussed above, discloses an automated draw winder, in which a snagging technique is used to snag an end of optical fiber for winding onto a bulk spool. As disclosed therein, the snagging technique results in a "snag end" residing on the inside face of the spool flange. For various reasons, it may be advantageous for the snag end to reside on the outside face of the spool flange. The presently disclosed spool and winding system may be used to accomplish this by capturing the snag end on the outside face of the spool flange and using a slot in the flange as described above to move the fiber from the outside of the flange to the inside of the flange for winding.

FIG. 11 shows a bottom view of an outboard flange 26d incorporating a rib pattern that may be advantageously used in practicing the present invention. A slot 32 identical to that shown in FIG. 8b may be included to allow the optical fiber to easily pass from the lead meter portion to the primary portion during winding. Although it should be understood that the rib pattern is capable of use in isolation from the slot. As shown in FIG. 11, outboard flange 26d preferably combines three types of ribs: radial ribs 86, a circumferential rib 88, and curved ribs 90, although each may be utilized individually. The radial ribs 86 are preferably equally-spaced straight ribs that extend in a radial direction from the circumferential rib 88 to the periphery of the flange 26d and which include a taper as they progress towards the periphery. The circumferential rib 88 is a circular rib that provides both a functional surface for the above-described lead meter creation process as well as a structural tie between the radial ribs 86 and the curved ribs 90. It should be understood that the circumferential rib 88 extends slightly above the curved ribs 90 and the radial ribs 86 to provide a functional surface. In particular, the radial ribs 86 terminate at a point adjacent to the circumferential ribs 88.

The curved ribs 90 shown in FIG. 11 combine flange stiffness with a high strength-to-weight ratio and also facilitate manufacture using an injection molding process. A plurality of clockwise curved ribs 90a intersect a plurality of counter-clockwise curved ribs 90b to form an intertwined strengthening structure. Preferably, the curved ribs 90a, 90b intersect at multiple points. Most preferably, the curved ribs 90a, 90b intersect at the lead meter barrel 28 and also at the circumferential rib 88. The radially extending ribs 86 preferably extend outward from the intersection points 89.

The increased strength is a result of the manner in which the curved ribs 90 cooperate and intersect to form at least a first and preferably, as illustrated in FIG. 11, a second row of diamond-shaped support members which extend around the circumference of the flange. The curved shape of the ribs 90, together with the angled intersections formed to make the diamond support structure, facilitate molding via an injection molding process. Of course, it is preferable that similar or identical strengthening structures, such as curved intersecting ribs, circumferential ribs, and/or radial ribs are included on the inboard flange, as well. Moreover, although one style of intersecting curved ribs is illustrated in FIG. 11, various other shapes of curvatures may be implemented as well.

Figure 12A:
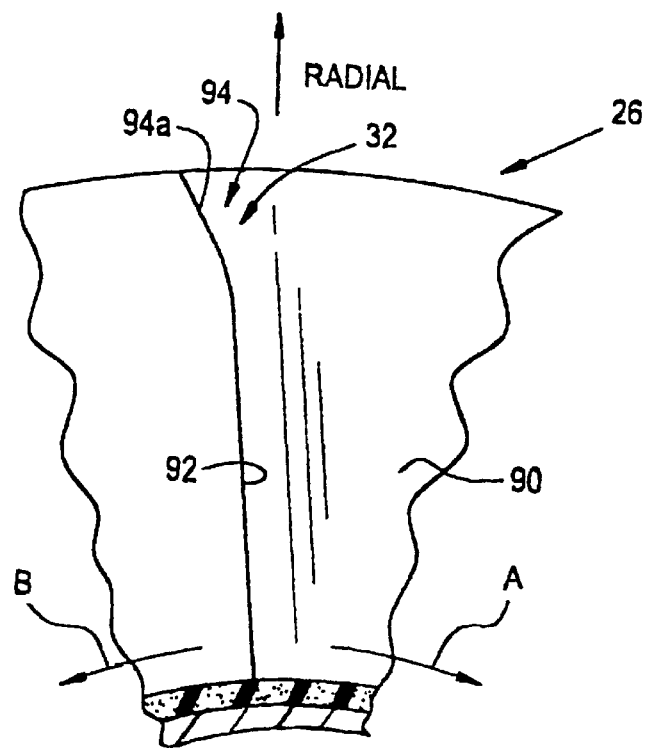
FIGS. 12A and 12B show, respectively, side and bottom views of a shipping spool according to the invention including an anti-traverse profile.
Figure 12B:
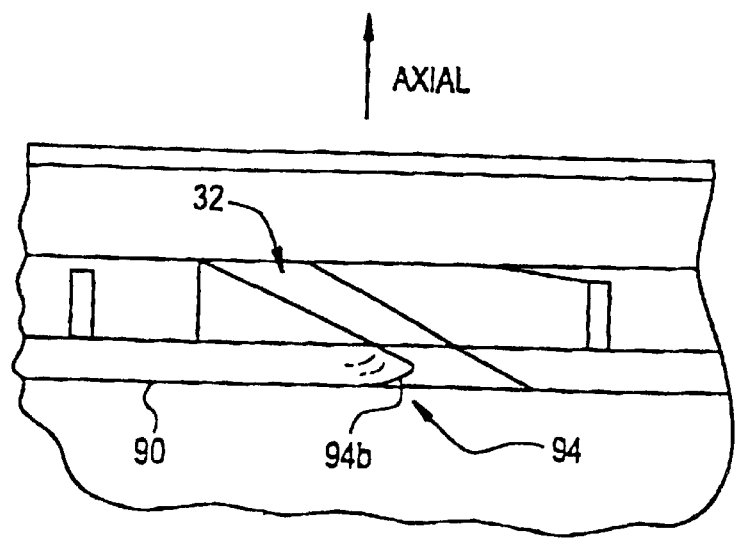

FIGS. 12A and 12B illustrate another important feature of the slot 32. This feature is important when, for whatever reason, the fiber is rewound onto the spool in a direction opposite (designated by arrow B) to the original wind direction (designated by arrow A). For example, some end users may wish to place further treatments or coatings on the fiber and then rewind it onto a spool. As shown in FIG. 12A, which is a view looking from the center of the spool towards the inboard surface 90 (FIG. 2C) of the flange 26, the trailing edge 92 of the slot 32 includes at its outermost radial extent, an anti-traverse profile 94. The profile 94 preferably includes a compound radiused surface, i.e., a radius along two orthogonal directions. However a radius, taper, combinations thereof or other non-straight profiles may provide similar results. This profile 94 prevents the fiber, as it as being wound in reverse, from inadvertently traversing back through the slot 32.

The profile 94 may include, for example, a radial component 94a, as is shown in FIG. 12A, wherein the trailing edge 92 departs from a straight line path along the radial direction near the radial terminal portion of the flange 26. Moreover, as best shown in FIG. 12B, the profile 94 on the trailing edge 92 may also include an axial, non-straight component 94b along its length, i.e., the profile extends from the inboard surface 90 into the flange 26 in an axial direction. This component 94b may also include a compound radius, full radius, taper, combinations thereof, or other like shapes which further minimizes the possibility of the fiber traversing back through the slot 32 on a reverse wind.

A suitable amount or extent of radius, taper or other profile will be determined in accordance with the winding speed and conditions. Because of the wind angle, a suitable profile 94 virtually eliminates the chance of re-traversing through the slot 32. By way of example, and not to be considered limiting, in a spool with 12 cm radius flange and 7.5 cm radius spool, it has been determined that a radius of between about 1.0 mm and 5.0 mm on the axial component 94b and a radius of about 3.5 mm on the radial component 94a blending into a 3.0 mm straight section near the periphery provides conditions that desirably allow for over-travel of the winding spool head of about 3 mm beyond the flange 26 without any anti-traverse through the slot 32 occurring.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A spool for receiving an optical fiber, comprising:
   a primary barrel and a lead meter barrel separated from each other by an outboard flange,
   the outboard flange having an inwardly-directed face and a slot extending to a periphery of the outboard flange, the slot providing a path for fiber between the lead meter and primary barrels, the slot having an inlet facing the lead meter barrel and an outlet facing the primary barrel and the slot including a lead-in surface and a working surface opposite the lead-in surface wherein the working surface is not parallel to the lead-in surface and the outlet is narrower than the inlet, as measured between the working surface and lead-in surface, the working surface of the slot being angled at less than 90 degrees relative to the inwardly-directed face.

2. The spool according to claim 1, wherein the slot is angled such that when fiber being wound onto the lead meter barrel comes into contact with the slot inlet, the fiber is drawn into the slot and then guided by the working surface of the slot onto the primary barrel.

3. The spool according to claim 1, wherein the lead-in surface of the slot forming an obtuse angle with respect to an immediately contiguous portion of the outboard flange, and the working surface forming an acute angle with respect to an immediately contiguous portion of the outboard flange.

4. The spool according to claim 3, wherein the lead-in surface of the slot includes a tapered portion, such that the fiber does not skip over the slot as the fiber is wound onto the spool at process line speed.

5. The spool according to claim 3, wherein the angle formed by the working surface with respect to the immediately contiguous portion of the outboard flange is less than about 45 degrees.

6. The spool according to claim 3, wherein the working surface is angled relative to the outboard flange such that the fiber is accelerated from the slot inlet to the slot outlet with minimal impact to fiber tension and coating.

7. A spool for receiving an optical fiber, comprising:
a primary barrel and a lead meter barrel separated from each other by an outboard flange,
the outboard flange having an inwardly-directed face and a slot extending to a periphery of the outboard flange, the slot providing a path for fiber between the lead meter and primary barrels, the slot having an inlet facing the lead meter barrel and an outlet facing the primary barrel and the slot including a lead-in surface and a working surface opposite the lead-in surface, the working surface of the slot being angled at less than 90 degree relative to the inwardly directed face wherein the outboard flange comprises a plurality of curved, intersecting ribs including a plurality of clockwise curved ribs that intersect and cross over a plurality of counter-clockwise curved ribs.

8. The spool according to claim 7 wherein the plurality of curved, intersecting ribs form at least one circumferential row of diamond-shaped strengthening members.

9. The spool according to claim 7 wherein the plurality of curved, intersecting ribs form a plurality of radially-spaced circumferential rows of diamond-shaped strengthening members.

10. The spool according to claim 7 further comprising a circumferential rib.

11. The spool according to claim 7 further comprising a plurality of radially extending ribs.

12. The spool according to claim 7 wherein the plurality of curved, intersecting ribs extend from a point adjacent to the lead meter barrel to a circumferential rib.

13. A spool for receiving an optical fiber, comprising:
a primary barrel and a lead meter barrel separated from each other by an outboard flange,
the outboard flange having an inwardly-directed face and a slot extending to a periphery of the outboard flange, the slot providing a path for fiber between the lead meter and primary barrels, the slot having an inlet facing the lead meter barrel and an outlet facing the primary barrel, the slot including a lead-in surface and a working surface opposite the lead-in surface, the working surface of the slot being angled at less than 90 degrees relative to the inwardly-directed face, and
an anti-traverse profile formed on a trailing edge of the slot.

14. The spool according to claim 13 wherein the anti-traverse profile includes an axial component.

15. The spool according to claim 13 wherein the anti-traverse profile includes a radial component.

16. An optical fiber winding spool, comprising:
a primary winding portion including first and second flanges, each flange including an inwardly directed surface,
a lead meter portion positioned adjacent to one of the flanges, and
a slot extending to a periphery of one of the flanges, the slot including opposed sides being angled relative to the inwardly directed surface of the flange including the slot at less than about 45 degrees wherein the slot provides a path for fiber to traverse between the lead meter and primary portions during winding.

17. An optical fiber winding spool, comprising:
a primary portion including first and second flanges, the primary portion adapted to have wound thereupon a bulk of the optical fiber,
a lead meter portion separated from the primary portion by the first flange and adapted to have wound thereupon a lead meter portion of optical fiber, the first flange including an inwardly-directed face, and
an angled, radially-extending slot formed in the first flange, the slot extending radially inward from a radial periphery of the first flange at an angle of about 20 degrees relative to the inwardly-directed face wherein the slot provides a path for the optical fiber to traverse between the lead meter and primary portions.

18. A system for winding optical fiber onto a spool, comprising:
a spool having primary and lead meter barrels separated by an outboard flange, an inboard flange positioned adjacent to an end of the primary barrel opposite from the outboard flange, the outboard flange and inboard flange each including inwardly-directed face and the outboard flange including a slot extending to a periphery of the outboard flange providing a path for optical fiber to pass between the lead meter barrel and the primary barrel, the slot having an inlet facing the lead meter barrel and an outlet facing the primary barrel and the slot including opposed lead-in and working surfaces, the working surface being angled at less than about 45 degrees relative to the inwardly-directed face,
the spool being rotatably mounted around a longitudinal axis relative to a fiber source such that when the spool is rotated after an end of the optical fiber from the fiber source is attached to the lead meter barrel, the optical fiber comes into contact with the inlet after a lead meter portion of the optical fiber is wound onto the lead meter barrel.

19. A system for winding fiber onto a spool, comprising:
a spool having primary and lead meter barrels separated by an outboard flange, the outboard flange including an inwardly-directed face and a slot extending to a periphery of the outboard flange providing a path for fiber between the lead meter barrel and the primary barrel, the slot having an inlet facing the lead meter barrel and an outlet facing the primary barrel and the slot including opposed lead-in and working surfaces, the working surface being angled at less than about 45 degrees relative to the inwardly-directed face,
the spool being rotatably mounted around a longitudinal axis relative to a fiber source such that when the spool is rotated after an end of the fiber from the fiber source is attached to the lead meter barrel, the fiber comes into contact with the slot inlet after a lead meter portion of the fiber is wound onto the lead meter barrel wherein the fiber source comprises a flying head.

20. A method for winding optical fiber onto a spool, comprising the following steps:
(a) providing a spool having primary and lead meter barrels separated by an outboard flange, an inboard flange on an opposite end of the primary barrel from the outboard flange, the outboard flange having an inwardly-directed face and a slot extending to a periphery of the outboard flange providing a path for optical fiber between the lead meter and primary barrels, the slot having an inlet facing the lead meter barrel and an outlet facing the primary barrel, the slot including first and second opposed side surfaces, the first opposed side surface being angled at less than 90 degrees relative to the inwardly-directed face;
(b) winding a lead meter segment of the optical fiber onto the lead meter barrel from a fiber source,
(c) traversing the optical fiber through the slot, and
(d) winding the optical fiber onto the primary barrel between the inboard and outboard flanges wherein the steps of winding the lead meter segment and primary barrel include traversing a flying head.

21. A fiber optic winding spool, comprising:
a flange including a plurality of curved, intersecting ribs, and a circumferential rib located radially outward from the plurality of curved, intersecting ribs, the flange further comprising a plurality of clockwise curved ribs that intersect and cross over a plurality of counter-clockwise curved ribs, wherein ends of at least some of the plurality of curved, intersecting ribs terminate and meet at intersection points located on the circumferential rib.

22. The spool according to claim 21 wherein the plurality of curved, intersecting ribs form at least two radially-spaced circumferential rows of four-sided diamond-shaped strengthening members.

23. The spool according to claim 21 wherein the plurality of curved, intersecting ribs form a plurality of radially-spaced circumferential rows of four-sided diamond-shaped strengthening members, the radially-spaced circumferential rows being spaced a different radial distances from a centerline of the spool.

24. The spool according to claim 21 wherein the plurality of curved, intersecting ribs intersect each other at multiple positions.

25. The spool according to claim 21 wherein the flange further comprises a circumferential rib.

26. The spool according to claim 21 wherein the flange includes a plurality of radially extending ribs.

27. The spool according to claim 21 wherein the plurality of curved, intersecting ribs extend from a point adjacent to a lead meter barrel to a circumferential rib.

28. The spool according to claim 21 wherein the plurality of curved, intersecting ribs intersect at points adjacent to a lead meter barrel.

29. A fiber optic winding spool, comprising:
(a) a primary fiber receiving portion adapted to receive a bulk of an optical fiber,
(b) first and second flanges extending from the primary receiving portion,
(c) a plurality of curved, intersecting ribs positioned on at least one of the flanges, the intersecting ribs further comprising a plurality of clockwise curved ribs that intersect and cross over a plurality of counter-clockwise curved ribs, and a circumferential rib located radially outward from the plurality of curved, intersecting ribs, wherein ends of at least some of the plurality of curved, intersecting ribs terminate and meet at intersection points located on the circumferential rib, and
(d) a secondary fiber receiving portion extending from one of the flanges and adapted to receive a lead meter portion of the optical fiber.

30. A fiber optic winding spool, comprising:
(a) a primary receiving portion adapted to receive a bulk of an optical fiber,
(b) first and second flanges extending from the primary receiving portion,
(c) a plurality of curved, intersecting ribs positioned on at least one of the first and second flanges,
(d) a secondary receiving portion extending from one of the first and second flanges
(e) an angled, radially extending slot extending the one of the first and second flanges from which the secondary receiving portion extends, from a peripheral portion of the flange from which the secondary receiving portion extends wherein the optical fiber is adapted, to pass between the secondary and primary receiving portions.

31. An optical fiber winding spool, comprising:
a primary barrel formed between an inboard flange and an outboard flange, and a lead meter barrel protruding axially from the outboard flange, the lead meter barrel including a lead meter flange positioned on an end of the lead meter barrel opposite from the outboard flange, wherein the primary barrel, inboard and outboard flanges and lead meter barrel are made from molded plastic,
the outboard flange having an inwardly-directed face and an integrally molded slot extending to a periphery of the flange, the slot including opposed first and second sides wherein a first one of the first and second sides of the slot is angled at less than 90 degrees relative to the inwardly-directed face.

32. The winding spool of claim 31 wherein the opposed first and second sides are non-parallel.

33. An optical fiber winding spool, comprising:
a first receiving portion having inboard and outboard flanges extending therefrom, the first receiving portion adapted to have a first length of optical fiber wound thereon,
a second receiving portion protruding from the outboard flange having a lead meter flange on an end of the second receiving portion, the second receiving portion adapted to have a second length of the optical fiber wound thereon between the outboard flange and lead meter flange,
the outboard flange separating the first and second receiving portions, the outboard flange including an inwardly directed face, and
a molded slot formed in the flange, the molded slot extending from a outboard flange toward the first and second receiving portions, the slot including opposed sides that are both angled at less than 90 degrees relative to the inwardly-directed face wherein fiber interconnecting the first and second lengths is adapted to pass through the slot.

34. A fiber optic winding spool, comprising:
a flange including a plurality of curved, intersecting ribs and a circumferential rib located radially outward from the plurality of curved, intersecting ribs, wherein ends of at least some of the plurality of curved, intersecting ribs terminate and meet at intersection points located on the circumferential rib.

35. A fiber optic winding spool, comprising:

a flange including a plurality of curved, intersecting ribs and a circumferential rib located radially outward from the plurality of curved, intersecting ribs, wherein the plurality of curved, intersecting ribs terminate at intersection points located at the circumferential rib, and a plurality of radially extending ribs that are radially aligned with the intersection points.

36. A spool for receiving an optical fiber, comprising:

a primary barrel having an inboard and outboard flange extending therefrom, each flange including an inwardly-directed face, a lead meter barrel separated from the primary barrel by the outboard flange, the lead meter barrel being adjacent to and protruding from the outboard flange, the outboard flange having a slot extending to a periphery of the outboard flange, the slot providing a path for optical fiber between the lead meter and primary barrels, the slot having an inlet facing the lead meter barrel and an outlet facing the primary barrel and the slot includes a lead-in surface and a working surface opposite the lead-in surface, the lead-in surface of the slot forming an obtuse angle with respect to an immediately contiguous portion of the outboard flange, and the working surface forming an acute angle with respect to an immediately contiguous portion of the outboard flange wherein the angle formed by the working surface with respect to the immediately contiguous portion of the outboard flange is about 20 degrees wherein the slot provides a path for optical fiber to traverse between the primary and lead meter barrels.

37. A spool for receiving an optical fiber, comprising:

a primary barrel and a lead meter barrel separated from each other by an outboard flange, the outboard flange having an inwardly-directed face and a slot extending to a periphery of the outboard flange, the slot providing a path for fiber between the lead meter and primary barrels, the slot having an inlet facing the lead meter barrel and an outlet facing the primary barrel and the slot including a lead-in surface and a working surface opposite the lead-in surface, the working surface of the slot being angled at less than 90 degrees relative to the inwardly-directed face, and a plurality of curved, intersecting ribs that extend from a point adjacent to the lead meter barrel to a circumferential rib, and a plurality of radially directed ribs extending from the circumferential rib towards an outermost periphery of the outboard flange of the spool.

38. An optical fiber winding spool, comprising:

a primary portion-including first and second flanges, the primary portion adapted to have wound thereupon a bulk of optical fiber, a lead meter portion separated from the primary portion by the first flange and adapted to have wound thereupon a lead meter portion of the optical fiber the first and second flanges including opposed inwardly-directed faces, and an angled, radially-extending slot formed in the first flange, the slot extending radially inward from a radial periphery of the first flange, the slot being angled of less than about 45 degrees relative to the inwardly-directed face of the first flange wherein the slot provides a path for the optical fiber to traverse between the lead meter and primary portions.

\* \* \* \* \*

UNITED STATES PATENT AND TRADEMARK OFFICE
CERTIFICATE OF CORRECTION

PATENT NO. : 6,533,216 B1 Page 1 of 1
DATED : March 18, 2003
INVENTOR(S) : Kirk P Bumgarner et al.

It is certified that error appears in the above-identified patent and that said Letters Patent is hereby corrected as shown below:

Column 13,
Line 31 "degree relative to the inwardly directed face wherein" should be -- degrees relative to the inwardly directed face wherein --

Column 16,
Line 15, "the first and second flanges" should be -- the first and second flanges and adapted to receive a lead meter portion of the optical fiber, and --
Line 16, "(e) an angled, radially extending slot extending the one of" should be
-- (e) an angled, radially extending slot extending into the one of --
Line 20, "extends wherein the optical fiber is adapted, to pass" should be -- extends wherein the optical fiber is adapted to pass --
Line 54, "extending from a outboard flange toward the first and" should be -- extending from a periphery of the outboard flange toward the first and --

Column 18,
Line 16, "a primary portion-including first and second flanges, the" should be
-- a primary portion including first and second flanges, the --
Line 21, "a lead meter portion of the optical fiber the first and" should be -- a lead meter portion of the optical fiber, the first and --

Signed and Sealed this

Twelfth Day of August, 2003

JAMES E. ROGAN
*Director of the United States Patent and Trademark Office*